(12) United States Patent
Costaglia

(10) Patent No.: US 7,125,078 B2
(45) Date of Patent: Oct. 24, 2006

(54) DEVICE FOR THE ADJUSTMENT OF THE COMPRESSION FORCE OF THE SPRING IN AN ARTICULATION FOR A CHAIR

(75) Inventor: Massimo Costaglia, Galliera Veneta (IT)

(73) Assignee: Metalseat SrL, Galliera Veneta (IT)

( * ) Notice: Subject to any disclaimer, the term of this patent is extended or adjusted under 35 U.S.C. 154(b) by 388 days.

(21) Appl. No.: 10/741,221

(22) Filed: Dec. 19, 2003

(65) Prior Publication Data
US 2004/0130196 A1    Jul. 8, 2004

(30) Foreign Application Priority Data
Dec. 31, 2002  (IT)  ............... TV2002A0162

(51) Int. Cl.
*A47C 1/032*  (2006.01)
(52) U.S. Cl. .............. 297/300.5; 297/302.4; 297/303.6
(58) Field of Classification Search ............ 297/300.5, 297/301.4, 302.4, 303.6
See application file for complete search history.

(56) References Cited

U.S. PATENT DOCUMENTS

| | | | | |
|---|---|---|---|---|
| 3,417,956 | A * | 12/1968 | Helms | ............ 248/576 |
| 4,653,806 | A * | 3/1987 | Willi | ............ 297/300.5 |
| 4,695,093 | A * | 9/1987 | Suhr et al. | ............ 297/303.4 |
| 4,711,491 | A | 12/1987 | Ginat | |
| 4,986,601 | A | 1/1991 | Inoue | |
| 5,207,479 | A | 5/1993 | Wickman et al. | |
| 5,564,783 | A * | 10/1996 | Elzenbeck et al. | ....... 297/300.2 |
| 6,033,020 | A * | 3/2000 | Ito | ............ 297/302.4 |
| 6,758,523 | B1 * | 7/2004 | VanDeRiet et al. | ...... 297/300.5 |
| 6,796,611 | B1 * | 9/2004 | Bock | ............ 297/300.5 |

FOREIGN PATENT DOCUMENTS

| | | |
|---|---|---|
| EP | 0198056 | 5/1986 |
| FR | 2075176 | 10/1971 |
| WO | WO 91/14385 | 10/1991 |

* cited by examiner

*Primary Examiner*—Peter R. Brown
(74) *Attorney, Agent, or Firm*—Egbert law Offices

(57) ABSTRACT

A device for adjusting the compression force of the spring in an articulation of a seat of the type equipped with a mobile "rocket launcher"-type base, from which base there rises a column, adjustable in height, which supports a reciprocally hinged seat plane and a seat back, whereby the seat back supports a headrest and a lumbar support that is also adjustable. The seat plane is attached at the front, by means of two straps, to the corresponding front side of a central support body secured to the top of the adjustable column along the vertical axis. The central support body, at the back, keeps hinged in place the lower ends of the two support uprights of the armrests, equipped with a device for adjusting the height of the chair and a device for locking/releasing the swinging of the seat back and seat, said uprights being further hinged in an intermediate position at the ends of the support frame of the seat back. The frame of the seat back is hinged along the sides and near to the rear part of the seat. Between the central support body and the support frame of the seat back, a helical compression spring is interposed, including, near to one end, a spring support that slides between a cylindrical articulation body and a support rod comprised of a pin on which is pivoted a lever with one end resting against the spring support, while the opposite end, partially located inside a tubular element perpendicular to said spring support, exerts a force on a hemispheric cap on the top of a threaded pin equipped with a knob and sliding inside said tubular element, using a threaded bushed bearing located at the protruding end of the same tubular element.

7 Claims, 5 Drawing Sheets

DEVICE FOR THE ADJUSTMENT OF THE COMPRESSION FORCE OF THE SPRING IN AN ARTICULATION FOR A CHAIR

RELATED U.S. APPLICATIONS

Not applicable.

STATEMENT REGARDING FEDERALLY SPONSORED

RESEARCH OR DEVELOPMENT

Not applicable.

REFERENCE TO MICROFICHE APPENDIX

Not applicable.

FIELD OF THE INVENTION

The subject of the present invention is a device for the adjustment of the compression force of the spring in an articulation for a chair, and is particularly suited to an adjustable office chair structure with an articulation for the synchronized movement of the seat and the seat back.

The proposal finds a particular, but not exclusive, application in the sector of quality chairs for office furnishings.

BACKGROUND OF THE INVENTION

Office seats and chairs of the type equipped with mechanisms of adjustment and adaptation so as to permit a wide range of users to sit comfortably are certainly well-known. In contrast to lower-priced models of the type with a seating position and seat back which are fixed, they incorporate, in addition to a device for adjusting the height of the seat, the use of a device for the controlled swinging of the seat back, generally located in the part immediately beneath the seat plane and integral to it. This device is primarily activated via a protruding lever that can easily be gripped and therefore rotated in one direction or another, until the internal mechanism releases the articulation.

In short, it is therefore possible to maintain that the following are known:
1. chairs in which the seat and seat back are designed with separate body shells, which are connected in such a way that an inclination of the seat back corresponds to a parallel downward movement of the seat plane;
2. chairs in which only the seat back is freely swinging;
3. chairs in which the raising of the seat plane corresponds to the inclination of the seat back;
4. chairs in which both the seat and the seat back are individually adjustable;
5. finally, seats in which both the seat plane and the seat back, which are interconnected, perform a synchronized inclination movement.

Almost all of the solutions mentioned involve, for the purposes of cushioning the swinging movement of the seat back, the seat or both during the displacements due to the movements of the user, a means of cushioning, usually of the type consisting of a compression spring.

Prior Art

In the field of dynamic seating devices, a first dynamic device for chairs is described in FR2075176 (Suspa), involving a base equipped with a number of support arms, from which an upright rises, composed of a gas cylinder. The end of said gas cylinder, from which the activation button of the piston protrudes, is inserted inside a hole in the shape of a truncated cone, extracted monolithically from the containing box structure of the device.

More significant is U.S. Pat. No. 4,986,601 (Inoue), which mentions the swinging mechanism to support a seat and the seat back of a chair, consisting of a central column that extends from the base of the chair, a first support clamp connected to the central column by means of a pedestal, a second support clamp connected to the chair and hinged to the first support clamp by means of a shaft, a third support clamp connected to the rear support and hinged by means of a shaft to the second support clamp, and a shaft that hinges the first support clamp to the third support clamp. U.S. Pat. No. 4,986,601 (Inoue) also provides for a gas piston with a valve that can be actuated by a rod in the central column to selectively adjust the height of the column. Finally, U.S. Pat. No. 4,986,601 (Inoue) also provides for spring mechanisms to exert an opposing force on the second support clamp, positioned between the first and second clamps.

DE0198056 (Neumuller) is of interest. This is a swinging mechanism to support the seat plane and seat back of a chair, consisting of a central column that extends from the base of the chair, a first support clamp connected to the central column, a second support clamp connected to the seat plane and pivoted to the first clamp by a first pivot, a third support clamp connected to the seat back and hinged to the second support clamp by a second pivot, in addition to a mechanism that pivots the first support clamp to the third support clamp. DE0198056 (Neumuller) also provides for spring mechanisms positioned between the first and second support clamps, to exert an opposing force to the movement of the second clamp. DE0198056 (Neumuller) also provides for locking mechanisms, consisting of a third pivot connected to the first clamp and a fourth pivot connected to the second clamp, working together with a number of disks equipped with an elongated slot through which the pivot passes. A rod associated with the respective pivot provides the friction anchoring of the disks, which are thus held together.

Prior Art Concerning the Invention

The specific function for which provision is made for the presence of a spring in the field of chair structures, particularly chairs of the office type, which are equipped with appropriate articulations between the seat and seat back components, is principally the need to provide a means of counteracting the action exerted by the shifting of the user's weight during the swinging that occurs in the act of sitting down. Generally, it happens that the tension loads for which said springs need to be calibrated are considerable, which means that the consequent adjustment manoeuver involving the pre-loading of the same spring, for the purpose of allowing a greater or lesser counteraction in relation to the weight and requirements of the user, presents aspects of difficulty. Such aspects of difficulty principally concern both the structure of the pre-loading mechanism and the accessibility of the same adjustment device on the part of the user.

In the prior art, adjustment devices for the pre-loading of the spring in articulation structures for chairs are known, particularly for office chairs. In most cases, said pre-loading mechanisms primarily use devices composed of bevel gears, or via the use of threaded means are capable of guaranteeing the gearing-down necessary to permit the user to adjust the pre-loading of the spring by reducing the effort required to achieve it.

WO 91/14385 (Hansen) presents a description of a seating mechanism in which the seat plane is of the elastically inclinable type. A base support column constitutes the support for a clamp positioned obliquely to one end joined near the top of said support column, while, opposite to said clamp, is a hinged metal component for the support of a seat plane at right angles to a laminated leaf spring interposed between said clamp and said component for the support of the seat plane. Said spring is equipped with a pre-tensioning device composed of a threaded guide which, at one end, holds said spring in an area close to the fulcrum area, while with the opposite end it crosses said clamp so as to be able to be held by a threaded knob. The manipulation of this threaded knob by the user permits the discretionary variation of the pre-loading of the spring.

U.S. Pat. No. 4,711,491 (Ginat) contains a description of a swivelling and folding mechanism for seats. Within the limits of the cushioning device, U.S. Pat. No. 4,711,491 (Ginat) describes the latter as being composed of a helical spring which is interposed between a hollow cylindrical housing inside a clamp projecting from the upper end of a support column, and a component for the support of a seat plane pivoted to said clamp, near to the opposite end of which the latter is anchored to the same support column. A housing for holding the corresponding end of said helical spring is located within said seating component. Said hollow cylindrical housing is centrally equipped with a threaded seat for the passage of a threaded pin, into which is cut, near to the part which will be placed inside said cylindrical housing, a retaining body for the corresponding end of the spring, while at the opposite end, said threaded pin is equipped with a knob.

U.S. Pat. No. 5,207,479 (Wickman et al.) contains the description of a control mechanism for the swinging motions of a seat of the type equipped with an articulation for the movement of the seating plane and/or the seat back. The information contained in said patent document includes a pre-loading mechanism of a spring which includes an adjustable threaded means and a tension arm equipped with a mechanical linkage. Said mechanical linkage, on which the threaded means is positioned via the rotation of the latter, enables the variation of the pre-loading of the spring and the connected damper, which are located between the end of said mechanical linkage, opposite to the end at which said threaded means is positioned. In addition, said mechanism is equipped with means for determining the maximum and minimum extension of the swinging movement of the seat plane.

Disadvantages

All of the abovementioned solutions have certain limitations. In short, in the opinion of the applicant, all of the cited solutions have the disadvantage of requiring the user to make considerable use of the activation of the pre-loading mechanism. This use principally involves the need, given the considerable gearing-down necessary to the purpose, for repeated maneuvers to activate the pre-loading adjustment mechanism.

Likewise, all of the previously described solutions have the disadvantage of having said device for the adjustment of the pre-loading of the spring positioned in front of and underneath the seat plane. This positioning forces the user into an unnatural contortion at the time when the user decides to perform a recalibration of the pre-loading of the spring.

As far as the solution described in WO91/14385 (Hansen) is more specifically concerned, the principal limitation consists in having constructed said pre-loading device specifically for use in chair structures that utilize springs of the laminated type. Another limitation, in the opinion of the applicant, appears to be that said pre-loading device can only be adjusted with ease if the spring is in its position of highest compression.

Both the solution described in U.S. Pat. No. 4,711,491 (Ginat) and the solution described in U.S. Pat. No. 5,207,479 (Wickman et al.) possess a relevant disadvantageous feature in the fact that the device for adjusting the pre-loading of the spring is positioned underneath the seat plane near to the front part, with the consequence of limiting its accessibility to the user. In addition, such a solution is intended specifically for structures of seats in which the seat plane is articulated in only one place. A further limitation can be found in the fact that, in said solution, it seems that an adjustment of the pre-loading of the spring can only be performed with ease when the user is not sitting down on the seat. Indeed, if the user is seated, the combination of the thrust of the spring and the weight of the user prove to be circumstances that are capable of increasing wear and tear, in such a way as to make said adjustment noticeably difficult.

As regards the solution described in U.S. Pat. No. 5,207,479 (Wickman et al.), apart from the indicated limitation of making it difficult to access the adjustment of the spring, by positioning said control underneath and towards the front of the seat plane, in the opinion of the applicant, the latter limitation consists of the notable construction-related complication that the interposition of said mechanical linkage involves for the required specific structure of any articulation of the seat. This specific structure reflects negatively on the same industrialization process by resulting in an increase in the time and costs required to realize it and furthermore, in the opinion of the applicant, involving the reduced functionality of the whole.

BRIEF SUMMARY OF THE INVENTION

This and other purposes are fulfilled by the present innovation, according to the characteristics of which in the annexed claims, it solves the problems indicated above by means of a device for adjusting the compression force of the spring in an articulation of a seat of the type equipped with a mobile "rocket launcher"-type base, from which base there rises a column, adjustable in height, which supports a reciprocally hinged seat plane and a seat back, whereby the seat back supports a headrest and a lumbar support that is also adjustable, whereby:

the seat plane is attached at the front, by means of two straps, to the corresponding front side of a central support body secured to the top of the adjustable column along the vertical axis;

the central support body, at the back, keeps hinged in place the lower ends of the two support uprights of the armrests, equipped with a device for adjusting the height of the chair and a device for locking/releasing the swinging of the seat back and seat, said uprights being further hinged in an intermediate position at the ends of the support frame of the seat back;

the frame of the seat back is hinged along the sides and near to the rear part of the seat;

between the central support body and the support frame of the seat back, a helical compression spring is interposed, consisting of, near to one end, a spring support that slides between a cylindrical articulation body and a support rod equipped with a pin on which is pivoted a lever with one end resting against the spring support, while the opposite end, partially located inside a tubular element perpendicular to said spring support, exerts a force on a hemispheric cap on the top of a threaded pin equipped with a knob and sliding inside said tubular element, using a threaded bushed bearing located at the protruding end of the same tubular element.

Advantages

In this way, by means of the notable creative contribution, the effect of which constitutes an immediate technological advance, certain objectives are achieved, all substantially geared to permitting the use of the a more convenient device in comparison to the pre-existing solutions.

A first advantageous purpose consists of the realization of a spring pre-loading device in which the positioning of the adjustment knob, which projects laterally from the seat plane, enables optimal convenience of access, thus facilitating the user's adjustment of the same device.

A second advantageous purpose consists of the realization of a spring pre-loading device in an articulation of a seat that is capable of ensuring convenient and easy adjustment, independently of the fact that the same spring is subjected to the given load of the user's body weight.

A third advantageous purpose consists of the realization of a spring pre-loading device in an articulation of a seat that is capable of ensuring a suitable reduction in the effort necessary to adjust the pre-loading of the spring and, in the mean time, ensure that such an adjustment can take place without requiring the user to activate the knob for said adjustment for an extended length of time.

Yet another advantageous purpose consists of the realization of a spring pre-loading device in an articulation of a seat, which, by means of restricting the number of components required and ensuring they are structured in a suitable way, permits an appreciable reduction in the time and cost of manufacturing to be attained.

This and other advantages will be discussed in the following detailed description of at least one preferential solution for the implementation with the aid of the annexed schematic diagrams, the specifics of the execution of which are not intended to be restrictive, but only exemplary.

DETAILED DESCRIPTION OF THE INVENTION

Figure 1:
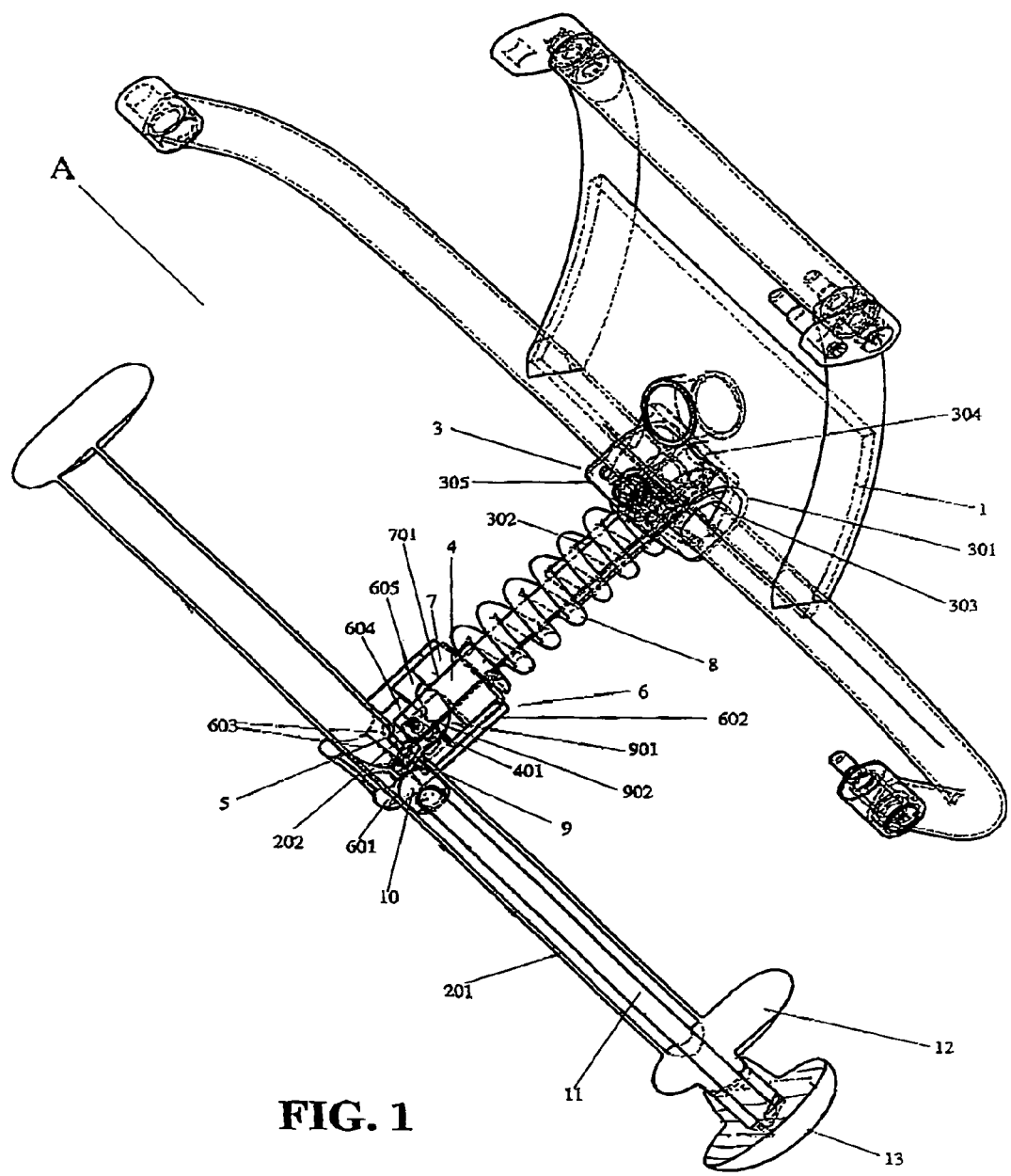
FIG. 1 is a partial sectional view of the pre-loading device anchored to a part of the chair articulation.
Figure 2:
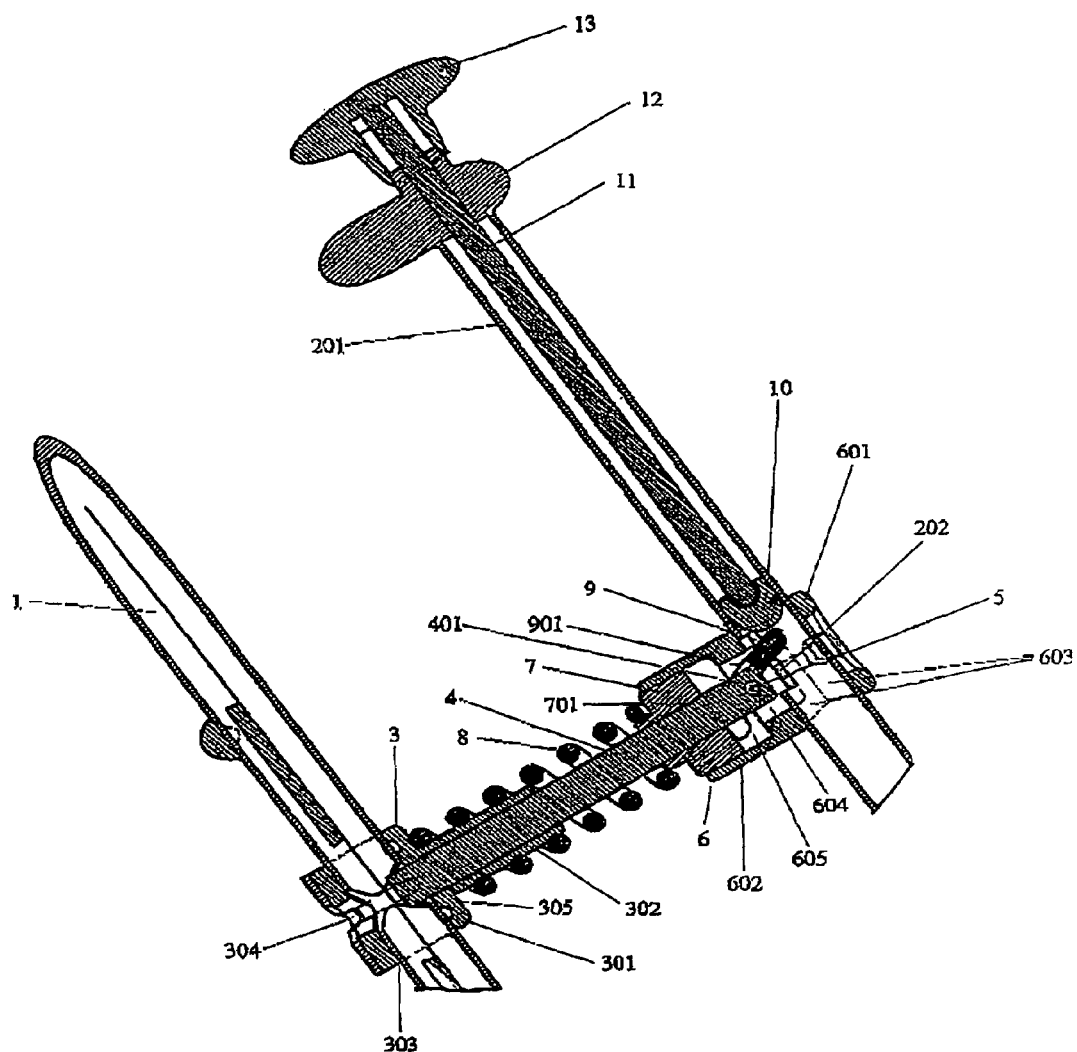
FIG. 2 is a longitudinal sectional view of the pre-loading device in the phase prior to the pre-tensioning of the spring.
Figure 3:
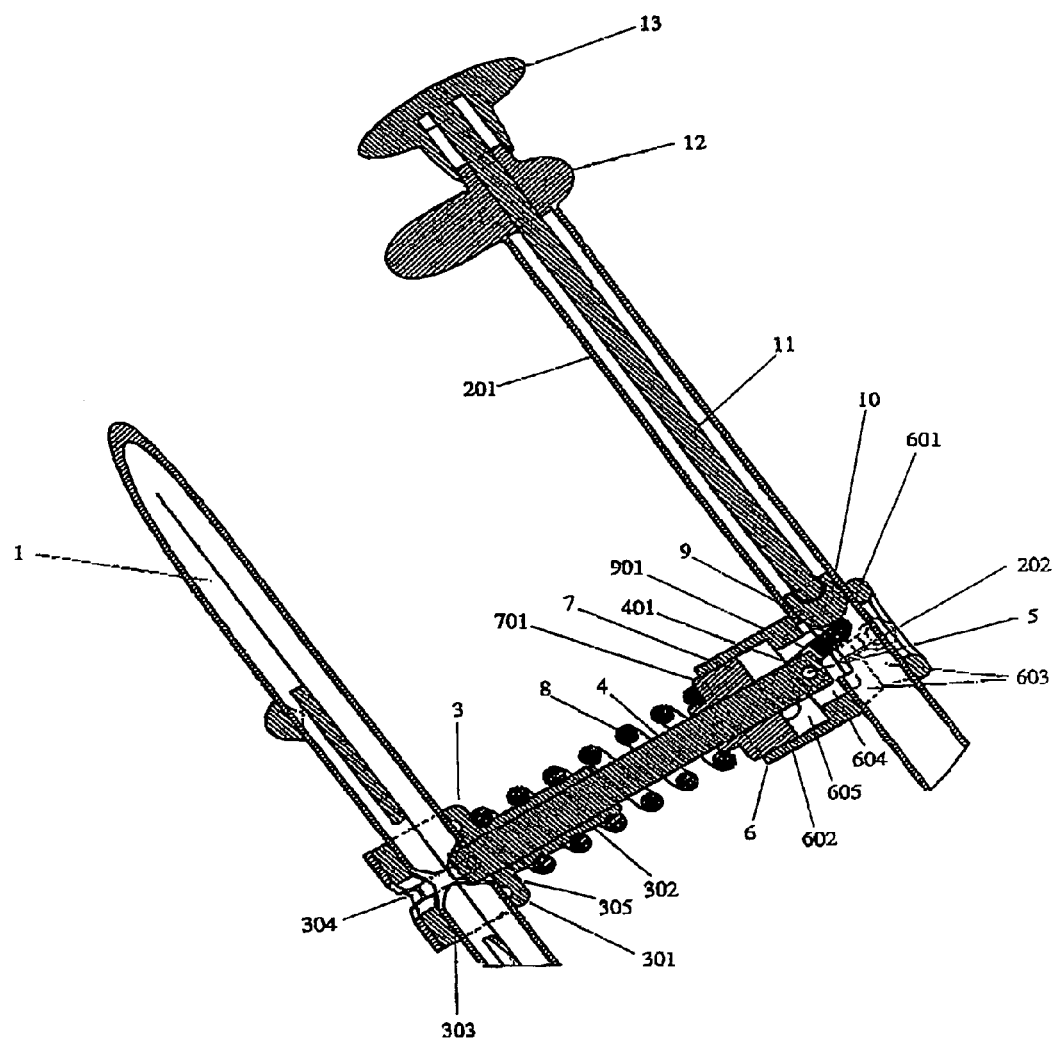
FIG. 3 is a longitudinal sectional view of the pre-loading device in the phase of intermediate pre-tensioning.
Figure 4:
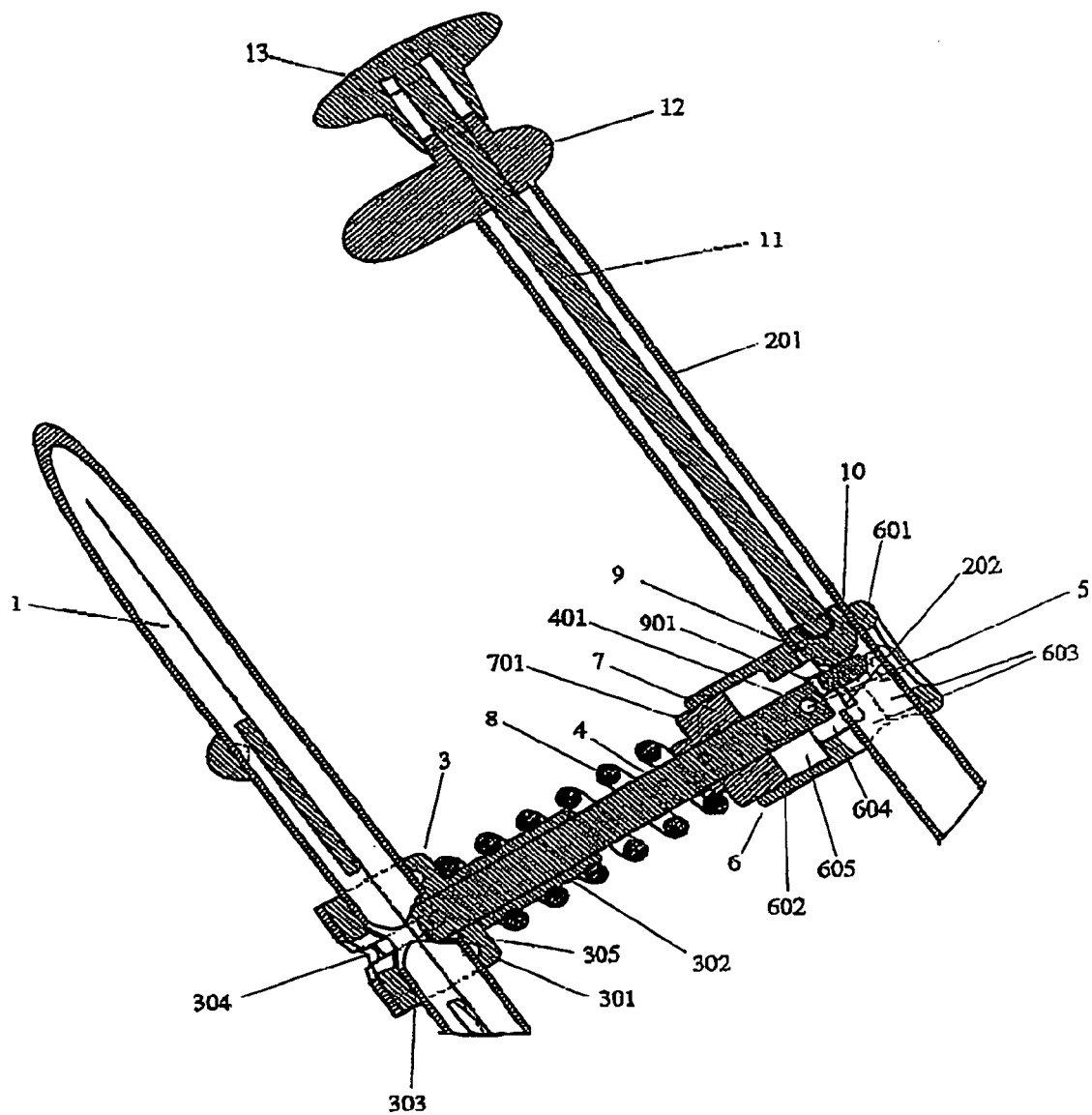
FIG. 4 is a longitudinal sectional view of the pre-loading device in the phase of high pre-tensioning of the spring.
Figure 5:
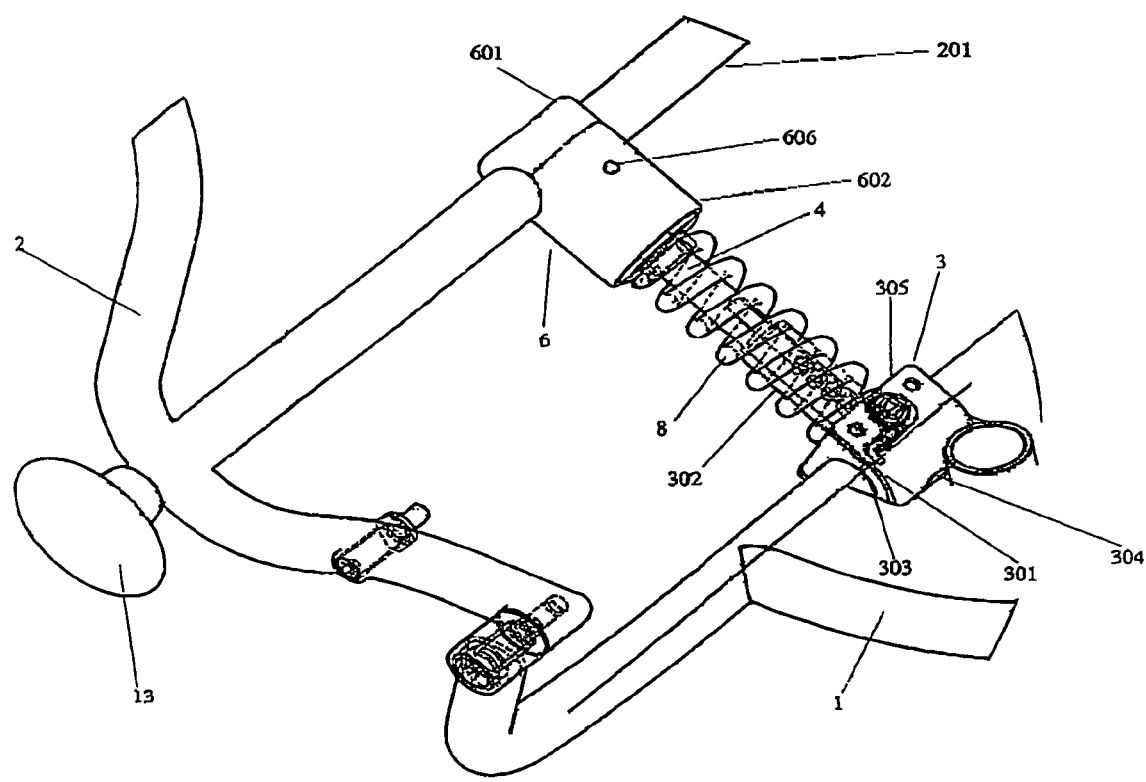
FIG. 5 is a perspective view of the pre-loading device anchored to a part of the chair articulation.

Taking the figures as a reference, it is observed that a device for adjusting the compression force, pre-loading, of the spring A in an articulation for a chair, particularly suited to the structure of an adjustable office chair, with an articulation for the synchronized movement of the seat and the seat back, and of the type including, between the central support body 1 and the lower part of the frame of the seat back 2, a retaining body 3, whereby the latter is shaped so as to possess a lower part 301 that is horizontally positioned and has a large size relative to an upper cylindrical part 302 that vertically overhangs the former part. Said lower part 301 of said retaining body 3 possesses, along its entire horizontal expanse, a hollow cylindrical housing 303 perpendicular to which there is the prearrangement of at least one housing for a means of fixation 304, the hollow cylindrical housing 303 of which is pre-configured to hold one of the tubular support elements positioned horizontally, which constitute said central support body 1. Said upper cylindrical part 302 of the retaining body 3 consists of a cylindrical element, hollow on the inside, and, relative to the lower part 301, located in an overhanging and perpendicular position.

On the inside of said internally hollow cylindrical element which comprises said upper cylindrical part 302 of said retaining body 3, there is, in a fixed position, a support rod 4 which, at the end opposite to the end fixed to the inside of said upper cylindrical part 302 of the retaining body 3, is equipped with a clearance hole 401, which constitutes the housing for a fixation pin 5. A cylindrical articulation body 6 is shaped in such a way as to be composed of an upper section 601 and a lower section 602, interconnected via the use of a threaded means of retention. Both the lower end of said upper section 601 of the cylindrical articulation body 6 and the upper end of said lower section 602 of the same cylindrical articulation body 6 are each equipped with a semi-cylindrical indentation 603 comprising the entire diameter of the lower section 602 and the upper section 601 of the cylindrical articulation body 6 by means of the retention of a hollow horizontal tubular element 201 which makes up the lower part of the frame of the seat back 2.

Said lower section 602 of the cylindrical articulation body 6 is shaped in such a way that it is hollow on the inside and forms a first cylindrical cavity 604 equipped with a diametrical clearance hole 606 for holding the fixation pin 5, the first cylindrical cavity 604 of which is positioned near to the upper end of said lower section 602 of the cylindrical articulation body 6, the internal gauge of which has dimensions that are relatively lower than the dimensions of a second cylindrical cavity 605 having a larger internal gauge and, relative to said first cylindrical cavity 604, a longer axial extension. Said second cylindrical cavity 605 is the housing for the sliding motion of a cylindrical spring support 7 which is equipped with an axial central clearance hole 701 for the sliding motion of the support rod 4. Between the lower end of said spring support 7 and the upper end 305 of said lower part 301 of the retaining body 3 is positioned a spring 8 of the helical compression type, whereby said spring is partially coiled around said upper cylindrical part 302 of the same retaining body 3. Said hollow horizontal tubular element 201 is equipped with an aperture 202 located near to the part supported on the semi-cylindrical indentation 603 of the lower section 602 of the cylindrical articulation body 6, whereby said aperture 202 has an extension approximately covering the area delineated by the gauge of said first cylindrical cavity 604 of the lower section 602 of the same cylindrical articulation body 6.

By means of said aperture 202 in the hollow horizontal tubular element 201, the passthrough occurs of the upper end of a lever 9 shaped so as to possess, originating from this upper end, a bifurcation so as to be composed of two "L"-shaped elements 901 where the junction zone between the vertical and horizontal sides is curved, and each of these same "L"-shaped elements 901 is equipped with an eyelet 902 positioned near to the middle zone. The distance between each of the said two "L"-shaped elements 901 is such as to permit the passage between the same of the upper end of the support rod 4. Said lever 9 is held by said fixation pin 5, and is free to be moved around a fulcrum such that the lower part of said two "L"-shaped elements 901 supports the upper end of the spring support 7. A hemispheric cap 10, located inside said hollow horizontal tubular element 201, is held on the head of a threaded pin 11 equipped on the opposite end with a knob 13, and is also in part positioned inside said hollow horizontal tubular element 201, and cooperates, by screwing, with a threaded bushed bearing 12 located near to the end of the hollow horizontal tubular element 201. The activation by the user of the knob 13, by means of screwing or unscrewing the threaded pin 11, permits, according to the desired requirements, the conveying to the hemispheric cap 10 of a pushing or releasing movement of the lever 9, which, acting on the spring support 7 permits the performance of an adjustment of the compression force of the same spring 8.

I claim:

1. A device for adjustment of a compression force of a helical compression spring in an articulation of a chair, the device comprising:
    a threaded bushed bearing;
    a threaded pin extending through said bushed bearings, said threaded pin having a knob at one end and a hemispherical cap at an opposite end;
    a cylindrical articulation body that is at least partially hollow:
    a lever positioned in said articulation body and having a retaining pin pivotably gearing the lever to said articulation body, said threaded pin cooperative with said lever;
    a support rod having a hole at one end thereof, said hole receiving a fixation pin therein, said end of said support rod received in said articulation body; and
    a spring support slidably mounted in said articulation body, said lever cooperative with said spring support so as to move said spring support within said articulation body relative to a movement of said threaded pin, said spring support having a surface suitable for bearing against the helical compression spring.

2. The device of claim 1, further comprising:
    a hollow horizontal tubular element having said hemispherical cap and a portion of said threaded pin therein, said tubular element having an aperture through which an end of the lever passes.

3. The device of claim 1, said lever having a bifurcation at an end thereof, said bifurcation defining two L-shaped elements each having a junction between a vertical side and a horizontal side, said junction being curved, each of said two L-shaped elements having an eyelet positioned at a middle thereof.

4. The device of claim 1, said articulation body having an upper section and a lower section threadedly connected together.

5. The device of claim 4, said lower section being hollow so as to define a first cylindrical cavity at an end thereof having a clearance hole for retaining said fixation pin, said lower section defining a second cylindrical cavity at an opposite end thereof, said second cylindrical cavity having an inner diameter that is greater than an inner diameter of said first cylindrical cavity, said spring support slidably received in said second cylindrical cavity.

6. The device of claim 1, said spring support having a central hole slidably receiving said support rod therein.

7. The device of claim 1, said articulation body having a lower end and an upper end, each of said lower end and said upper end having a semi-cylindrical indentation therein.

* * * * *